United States Patent
Franca et al.

(10) Patent No.: US 10,611,122 B2
(45) Date of Patent: Apr. 7, 2020

(54) PROCESS FOR SEALING FLEXIBLE FITMENT TO FLEXIBLE FILM

(71) Applicant: Dow Global Technologies LLC, Midland, MI (US)

(72) Inventors: Marcos Franca, Sao Paulo (BR); Bruno Rufato Pereira, Sao Paulo (BR); Raimund Gerstner, Bucaramanga (CO)

(73) Assignee: Dow Global Techologies LLC, Midland, MI (US)

(*) Notice: Subject to any disclaimer, the term of this patent is extended or adjusted under 35 U.S.C. 154(b) by 127 days.

(21) Appl. No.: 15/558,817

(22) PCT Filed: Mar. 15, 2016

(86) PCT No.: PCT/US2016/022457
§ 371 (c)(1),
(2) Date: Sep. 15, 2017

(87) PCT Pub. No.: WO2016/149263
PCT Pub. Date: Sep. 22, 2016

(65) Prior Publication Data
US 2018/0079170 A1   Mar. 22, 2018

Related U.S. Application Data

(60) Provisional application No. 62/134,269, filed on Mar. 17, 2015.

(51) Int. Cl.
*B29C 65/00* (2006.01)
*B32B 7/02* (2019.01)
(Continued)

(52) U.S. Cl.
CPC ............... *B32B 7/02* (2013.01); *B29C 65/18* (2013.01); *B29C 66/004* (2013.01);
(Continued)

(58) Field of Classification Search
CPC ..... B29C 65/34; B29C 65/242; B29C 65/4835
(Continued)

(56) References Cited

U.S. PATENT DOCUMENTS 4,417,753 A * 11/1983 Bacehowski ............. A61J 1/10
156/272.2
4,950,347 A * 8/1990 Futagawa ............... B29C 65/04
156/272.4
(Continued)

FOREIGN PATENT DOCUMENTS

JP    2008-127059 A    6/2008
JP    2009-280215 A    12/2009
(Continued)

OTHER PUBLICATIONS

A. Dobrynin, J. Chem. Phys. 107 (21), Dec. 1, 1997, pp. 9234-9238.
(Continued)

*Primary Examiner* — Mark A Osele
*Assistant Examiner* — Nickolas R Harm
(74) *Attorney, Agent, or Firm* — Quarles & Brady LLP

(57) ABSTRACT

The present disclosure provides a process. In an embodiment, the process includes A. providing a fitment with a base, the base comprising an ethylene/α-olefin multi-block copolymer; B. placing the base between two opposing multilayer films, each multilayer film having a respective seal layer comprising an olefin-based polymer; C. flat sealing the base to each multilayer film with opposing heated flat seal bars, the flat sealing forming opposing seal joints at the flattened base ends; and D. point sealing the opposing seal joints with opposing curved seal bars.

12 Claims, 4 Drawing Sheets

(51) Int. Cl.
| | |
|---|---|
| *B29C 65/18* | (2006.01) |
| *B31B 70/84* | (2017.01) |
| *B32B 1/02* | (2006.01) |
| *B32B 27/08* | (2006.01) |
| *B32B 37/00* | (2006.01) |
| *B32B 37/02* | (2006.01) |
| *B32B 37/18* | (2006.01) |
| *B29C 65/34* | (2006.01) |
| *B29C 65/24* | (2006.01) |
| *B29L 31/00* | (2006.01) |
| *B31B 160/10* | (2017.01) |

(52) U.S. Cl.
CPC ...... *B29C 66/0324* (2013.01); *B29C 66/1122* (2013.01); *B29C 66/3262* (2013.01); *B29C 66/3452* (2013.01); *B29C 66/53262* (2013.01); *B29C 66/53263* (2013.01); *B29C 66/71* (2013.01); *B29C 66/723* (2013.01); *B29C 66/7315* (2013.01); *B29C 66/73115* (2013.01); *B29C 66/81431* (2013.01); *B29C 66/81463* (2013.01); *B29C 66/83221* (2013.01); *B29C 66/91421* (2013.01); *B29C 66/91933* (2013.01); *B29C 66/91935* (2013.01); *B29C 66/92445* (2013.01); *B31B 70/844* (2017.08); *B32B 1/02* (2013.01); *B32B 27/08* (2013.01); *B32B 37/0084* (2013.01); *B32B 37/02* (2013.01); *B32B 37/18* (2013.01); *B29C 65/242* (2013.01); *B29C 65/34* (2013.01); *B29C 66/73116* (2013.01); *B29C 66/81423* (2013.01); *B29C 66/81811* (2013.01); *B29C 66/919* (2013.01); *B29C 66/929* (2013.01); *B29C 66/949* (2013.01); *B29K 2023/06* (2013.01); *B29K 2995/0046* (2013.01); *B29L 2031/712* (2013.01); *B29L 2031/7148* (2013.01); *B31B 2160/10* (2017.08); *B32B 2307/51* (2013.01); *B32B 2323/04* (2013.01); *B32B 2439/00* (2013.01)

(58) Field of Classification Search
USPC .......................................... 156/304.6, 304.8
See application file for complete search history.

(56) References Cited

U.S. PATENT DOCUMENTS

| | | | | |
|---|---|---|---|---|
| 5,226,564 | A | * | 7/1993 | Steer .................... A61F 5/4404 222/107 |
| 5,324,233 | A | * | 6/1994 | Owensby ............... B29C 65/18 493/190 |
| 5,976,300 | A | | 11/1999 | Buchanan et al. |
| 6,127,009 | A | * | 10/2000 | Strassmann ............... A61J 1/10 156/244.13 |
| 7,353,946 | B2 | * | 4/2008 | Cervantes ............ A61F 2/0095 206/1.5 |
| 7,608,668 | B2 | | 10/2009 | Li Pi Shan et al. |
| 7,858,706 | B2 | | 12/2010 | Arriola et al. |
| 7,893,166 | B2 | | 2/2011 | Li Pi Shan et al. |
| 7,947,793 | B2 | | 5/2011 | Marchand et al. |
| 8,151,851 | B2 | * | 4/2012 | Vess ........................ B29C 65/04 156/272.2 |
| 8,921,491 | B2 | | 12/2014 | Walton et al. |
| 9,481,152 | B2 | * | 11/2016 | Mileti .................... H01C 17/06 |
| 2009/0196537 | A1 | * | 8/2009 | Aikawa ............. B65D 75/5883 383/120 |

FOREIGN PATENT DOCUMENTS

| | | |
|---|---|---|
| JP | 2010-221521 A | 10/2010 |
| JP | 2010-221522 A | 10/2010 |
| WO | 2004/039562 A1 | 5/2004 |

OTHER PUBLICATIONS

I. Potemkin et al., Physical Review E, vol. 57, No. 6, Jun. 1998, pp. 6902-6912.

* cited by examiner

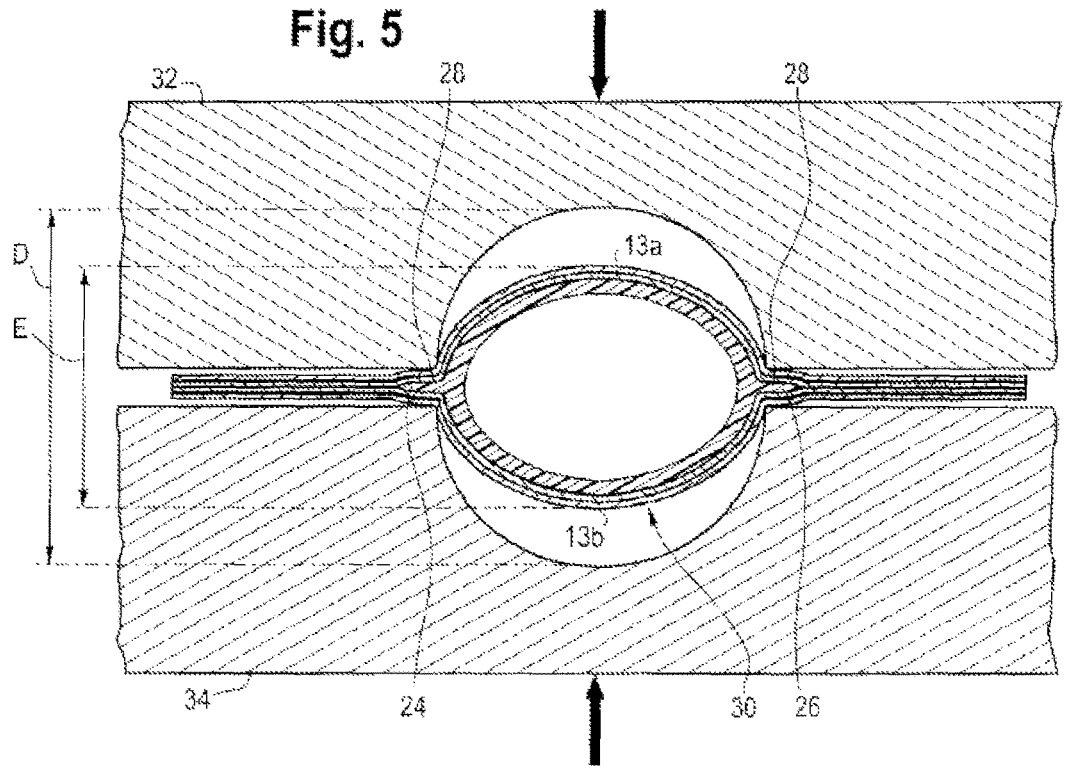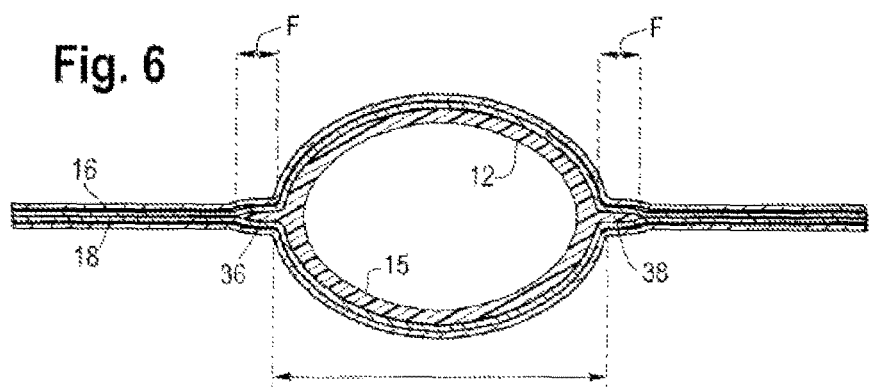

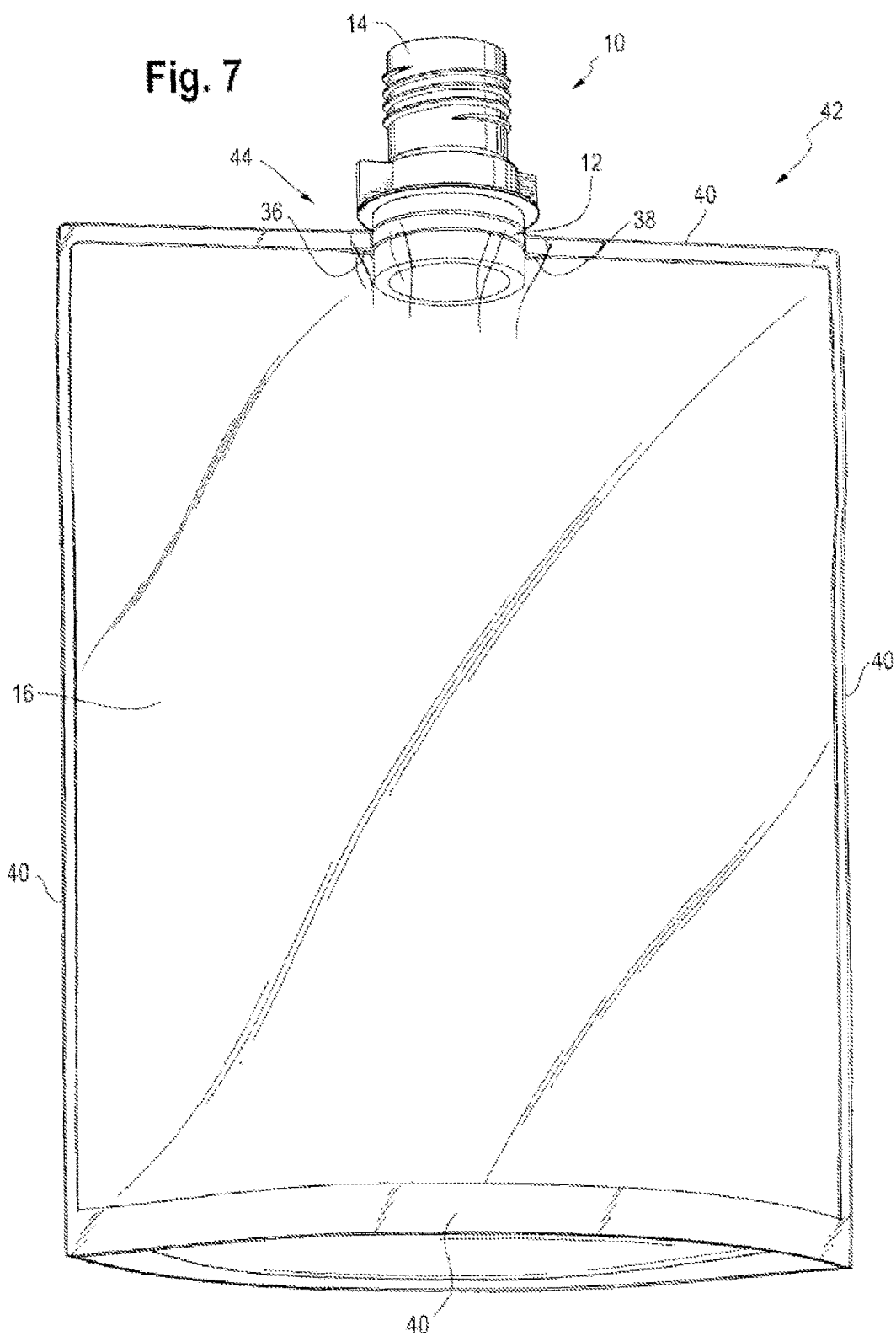

PROCESS FOR SEALING FLEXIBLE FITMENT TO FLEXIBLE FILM

The present disclosure is directed to a process for sealing a flexible fitment between two flexible films.

Known are flexible pouches with rigid pour spouts for storage and delivery of flowable materials, often referred to as "pour-pouches." Many conventional pour-pouches utilize a rigid pour spout, with the base of the spout having winglets. Each winglet is a structure that is perpendicular to the base, each winglet extends radially away (in opposing directions) from the annular base of the spout. Winglets are used to increase the surface area of the annular base in order to promote adhesion between the spout and flexible packaging film.

Winglets, however, are problematic because they require a specialized heat seal bar to effectively seal the winglet to flexible film packaging. The specialized heat seal bar requires a unique shape that mates with the shape of the spout base and winglet. In addition, the heat seal process requires precise and mated alignment between the spout and the films to ensure the spout is in parallel alignment with the film orientation.

As such, the production of flexible pouches is replete with inefficiency due to (1) the expense of specialized heat seal equipment, (2) the production down-time for precise seal bar-winglet alignment, (3) the production down-time required for precise spout-film alignment, (4) the failure rate (leaks) due to misalignment, and (5) the quality control steps required at each stage of pour-pouch production.

The art recognizes the need for alternative processes in the production of pour-pouches. The art further recognizes the need for improved pour spouts that avoid the production drawbacks of spouts having winglets.

SUMMARY

The present disclosure provides an improved fitment and concomitant improved fitment seal for pour-pouches. The present fitment reduces the amount of materials used to produce the fitment itself and also simplifies the pour-pouch production process.

The present disclosure provides a process. In an embodiment, the process includes:

A. providing a fitment with a base, the base comprising an ethylene/α-olefin multi-block copolymer;

B. placing the base between two opposing multilayer films, each multilayer film having a respective seal layer comprising an olefin-based polymer;

C. flat sealing the base to each multilayer film with opposing heated flat seal bars, the flat sealing forming opposing seal joints at the flattened base ends; and D. point sealing the opposing seal joints with opposing curved seal bars.

An advantage of the present disclosure is a fitment formed from ethylene/α-olefin multi-block copolymer, enabling thin-wall base.

An advantage of the present disclosure is a fitment formed from ethylene/α-olefin multi-block copolymer providing the base with sufficient integrity to survive compression during heat seal and the sufficient resiliency to spring back to an open position post-heat seal.

An advantage of the present disclosure is a pour-pouch production process that does not require precise seal bar-winglet alignment for heat sealing.

An advantage of the present disclosure is a fitment for pour-pouches that utilizes less polymeric material than the amount of polymeric material used in conventional winglet bases for rigid pour spouts.

An advantage of the present disclosure is a pour-pouch production process with that requires less time (greater efficiency) and fewer failures (higher productivity) compared to pour-pouch production processes utilizing spouts with winglets.

An advantage of the present disclosure is a flexible fitment with resiliency to spring back to an open position after full collapse during heat seal, the fitment made from ethylene/α-olefin multi-block copolymer that is compatible with seal layer polyolefins.

BRIEF DESCRIPTION OF THE DRAWINGS

FIG. 5 is an elevation view of a point sealing procedure in accordance with an embodiment of the present disclosure.

FIG. 6 is an elevation view of the fitment of FIG. 1 sealed to the multilayer films in accordance with an embodiment of the present disclosure.

FIG. 7 is a perspective view of a flexible container in accordance with an embodiment of the present disclosure.

DEFINITIONS

Figure 1:
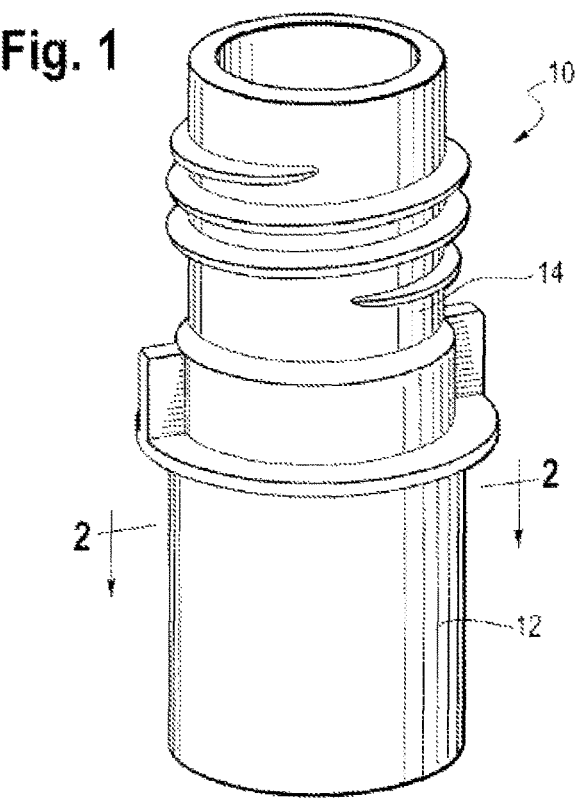
FIG. 1 is a perspective view of a fitment in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

Elastic recovery is measured as follows. Stress-strain behavior in uniaxial tension is measured using an Instron™ universal testing machine at 300% $min^{-1}$ deformation rate at 21° C. The 300% elastic recovery is determined from a loading followed by unloading cycle to 300% strain, using ASTM D 1708 microtensile specimens. Percent recovery for all experiments is calculated after the unloading cycle using the strain at which the load returned to the base line. The percent recovery is defined as:

% Recovery=100*($Ef$–$Es$)/$Ef$ where Ef is the strain taken for cyclic loading and Es is the strain where the load returns to the baseline after the unloading cycle.

An "ethylene-based polymer," as used herein is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a process. In an embodiment, the process includes:

A. providing a fitment with a base, the base comprising an ethylene/α-olefin multi-block copolymer;

B. placing the base between two opposing multilayer films, each multilayer film having a respective seal layer comprising an olefin-based polymer;

C. flat sealing the base to each multilayer film with opposing heated flat seal bars, the flat sealing forming opposing seal joints at the flattened base ends; and D. point sealing the opposing seal joints with opposing curved seal bars.

A. Fitment

The process includes providing a fitment 10. The fitment 10 has a base 12 and a top 14 as shown in FIG. 1. The fitment 10 may be made from one or more (i.e., a blend) of polymeric materials. The base 12 contains, or is otherwise formed from, an ethylene/α-olefin multi-block copolymer. The base 12 may be made from a polymeric blend composed of the ethylene/α-olefin multi-block copolymer and one or more additional polymers. Nonlimiting examples of suitable materials for blending with the ethylene/α-olefin multi-block copolymer include low density polyethylene (LDPE), linear low density polyethylene (LLDPE), high density polyethylene (HDPE), ethylene vinyl acetate (EVA), ethylene methyl acrylate (EMA), ethylene acrylic acid copolymer (EAA), propylene homopolymer, propylene copolymer, propylene impact copolymer.

Alternatively, the base 12 is made solely from the ethylene/α-olefin multi-block copolymer. The top 14 may include suitable structure (such as threads, for example) for attachment with a closure.

The base 12 has an elliptical cross section shape. In an embodiment, the cross section shape of the based 12 (pre-sealing) is circular, or substantially circular.

In an embodiment, the base 12 excludes rigid type bases such as canoe-shaped based and/or winglet-type bases.

In an embodiment, the base is only composed of, or is otherwise formed solely from, the ethylene/α-olefin multi-block copolymer.

In an embodiment the entire fitment 10 (the base 12 and the top 14) is only composed of, or is otherwise solely formed from, the ethylene/α-olefin multi-block copolymer.

Figure 2:
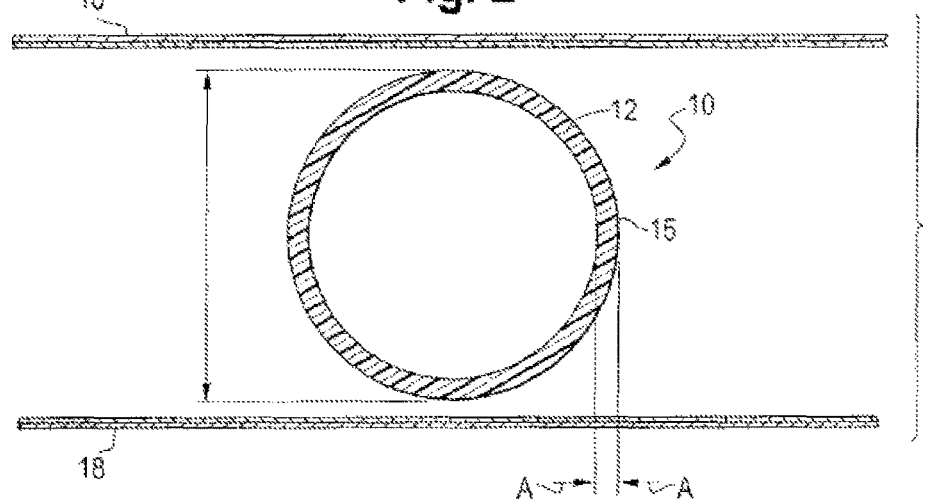
FIG. 2 is an elevation view of a fitment sandwiched between two multilayer films in accordance with an embodiment of the present disclosure.

In an embodiment, the base has a wall 15 with a thickness A, as shown in FIG. 2. The thickness A is from 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm. In a further embodiment, the wall 15 is solely composed of the ethylene/α-olefin multi-block copolymer and has the foregoing thickness A.

The base 12 is formed from (wholly or partially) ethylene/α-olefin multi-block copolymer. The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α-olefin multi-block copolymer may comprise 50 mol % to 90 mol % ethylene, or 60 mol % to 85 mol %, or 65 mol % to 80 mol %. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;

and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or 125° C.;

(ii) a density from 0.86 g/cc, or 0.87 g/cc, or 0.88 g/cc to 0.89 g/cc;

(iii) 50-85 wt % soft segment and 40-15 wt % hard segment;

(iv) from 10 mol %, or 13 mol %, or 14 mol %, or 15 mol % to 16 mol %, or 17 mol %, or 18 mol %, or 19 mol %, or 20 mol % octene in the soft segment;

(v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;

(vi) a melt index (MI) from 1 g/10 min, or 2 g/10 min, or 5 g/10 min, or 7 g/10 min to 10 g/10 min, or 15 g/10 min to 20 g/10 min;

(vii) a Shore A hardness from 65, or 70, or 71, or 72 to 73, or 74, or 75, or 77, or 79, or 80;

(viii) an elastic recovery (Re) from 50%, or 60% to 70%, or 80%, or 90%, at 300% min$^{-1}$ deformation rate at 21° C. as measured in accordance with ASTM D 1708.

(ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

In an embodiment, the ethylene/octene multi-block copolymer is sold under the Tradename INFUSE™ is available from The Dow Chemical Company, Midland, Mich., USA. In a further embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

B. Multilayer Films

The process includes placing the fitment base between two opposing multilayer films. The base 12 is placed, or otherwise is positioned, between two opposing multilayer films, multilayer film 16 and multilayer film 18 as shown in FIG. 2. Each multilayer film has a respective seal layer containing an olefin-based polymer.

In an embodiment, each multilayer film is flexible and has at least two, or at least three layers. The flexible multilayer film is resilient, flexible, deformable, and pliable. The structure and composition for each multilayer film may be the same or different. For example, each of two opposing multilayer films can be made from a separate web, each web having a unique structure and/or unique composition, finish, or print. Alternatively, each multilayer film can be the same structure and the same composition.

In an embodiment, each multilayer film 16, 18 is a flexible multilayer film having the same structure and the same composition.

Each flexible multilayer film 16, 18 may be (i) a coextruded multilayer structure or (ii) a laminate, or (iii) a combination of (i) and (ii). In an embodiment, each flexible multilayer film 16, 18 has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

The seal layer is a material capable of sealing the films to each other and capable of sealing to the fitment. Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers) and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™), blends thereof, and multilayer combinations thereof.

Nonlimiting examples of suitable polymeric materials for the tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, ethylene vinyl acetate (EVA), ethylene ethyl acrylate (EEA), propylene-based plastomers or elastomers such as VERSIFY™ (The Dow Chemical Company), grafted olefin-based polymer (MAH-grafted), and blends thereof. An optional tie layer is selected from either ethylene-based olefin block copolymer PE-OBC (sold as INFUSE™) or propylene-based olefin block copolymer PP-OBC (sold as INTUNEN. The outer layer includes greater than 50 wt % of resin(s) having a melting point, Tm, that is from 25° C. to 30° C., or 40° C. or higher than the melting point of the polymer in the seal layer wherein the outer layer polymer is selected from resins such as AFFINITY™, LLDPE (DOWLEX™), VERSIFY™ or VISTAMAX, ELITE™, MDPE, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, propylene-based plastomers or elastomers such as VERSIFY™ (The Dow Chemical Company), grafted olefin-based polymer (MAH-grafted), and blends thereof. The flexible multilayer film also includes an outer layer that is a polyamide.

In an embodiment, the flexible multilayer film is a coextruded film or a laminated film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded film or a laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm$^3$, or from 0.875 to 0.910 g/cm$^3$, or from 0.888 to 0.900 g/cm$^3$ and an outermost layer composed of a material selected from LLDPE, OPET, OPP (oriented polypropylene), BOPP, polyamide, and combinations thereof.

In an embodiment, the flexible multilayer film is a coextruded film or a laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film is a coextruded (or laminated) five layer, or a coextruded (or laminated) seven layer film having at least one layer containing a material selected from LLDPE, OPET, OPP (oriented polypropylene), BOPP, and polyamide.

In an embodiment, the flexible multilayer film is a coextruded (or laminated) five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminate) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

C. Flat Sealing

The present process includes flat sealing the base with opposing heated flat seal bars. FIG. 2 shows the base 12 located between multilayer film 16 and multilayer film 18. The term "flat sealing" is the act of compressing the base 12 with opposing flat heat seal bars such that opposing interior portions of the base wall 15 contact, or otherwise touch, each other. The base 12 is located, or otherwise is "sandwiched," between multilayer film 16 and the multilayer film 18. The film-base-film sandwich is moved to a first seal station and placed between flat seal bar 20 and flat seal bar 22. Flat seal bar 20 opposes flat seal bar 22, and the flat seal bars 20, 22 include suitable structure and mechanism to move the seal bars toward and away from each other in order to perform a heat sealing procedure. The flat seal bars 20 and 22 are heated and the process includes flat sealing the base 12, with the base sandwiched between multilayer film 16 and multilayer film 18. The flat sealing forms opposing seal joints 24, 26 at the flattened ends 23, 25 of the base 12, as shown in FIG. 3.

Figure 3:
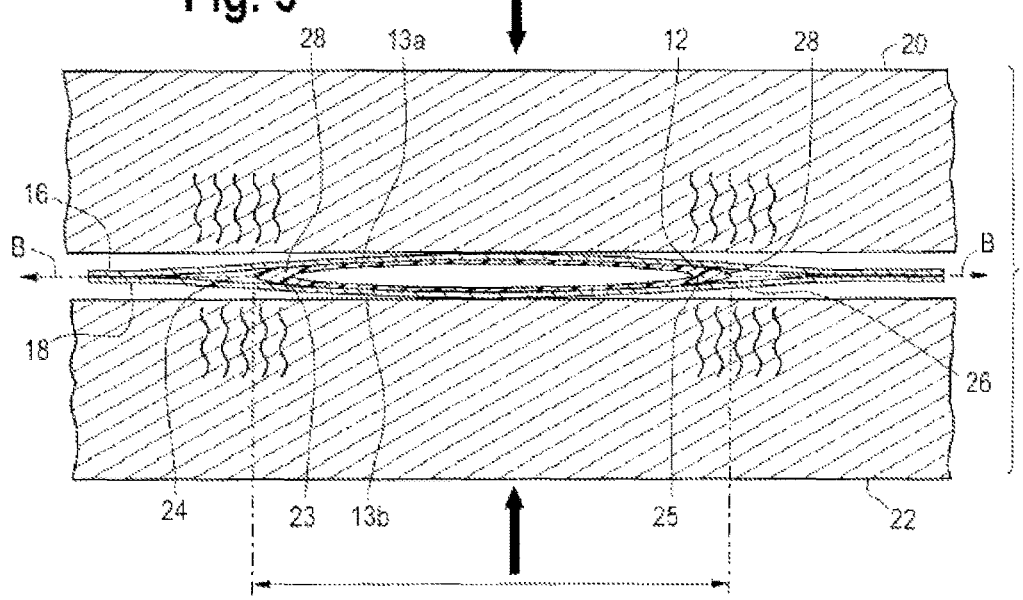
FIG. 3 is an elevation view of a flat sealing procedure in accordance with an embodiment of the present disclosure.
Figure 4:
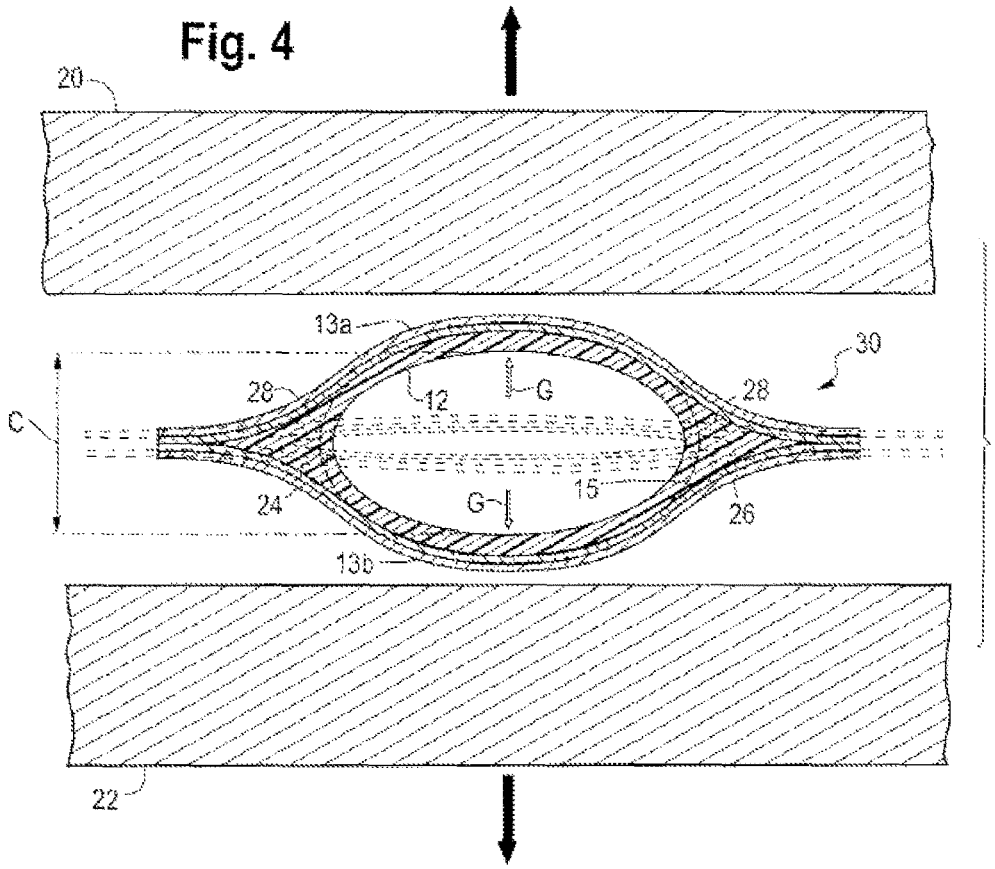
FIG. 4 is an elevation view of a welded construction in accordance with an embodiment of the present disclosure.

The flat sealing step includes adjoining, or otherwise welding, each multilayer film 16, 18 to respective upper portion 13a and a lower portion 13b of the base 12 as shown in FIGS. 3 and 4.

In an embodiment, the process includes:

(i) selecting, for the base, an ethylene/α-olefin multi-block copolymer having a melt temperature, Tm1, from 115° C. to 125° C.;

(ii) selecting, for the seal layers, an olefin-based polymer having a melt temperature, Tm2, such that Tm2 is from 10° C. to 40° C. less than Tm1.

In an embodiment, Tm2 is from 10° C., or 15° C., or 20° C. to 25° C., or 30° C., or 35° C., or 40° C. less than Tm1.

In an embodiment, each seal layer is formed from an ethylene-based polymer with a Tm2 from 10° C. to 40° C. less than the Tm1 of the ethylene/α-olefin multi-block copolymer in the base 12. The flat seal bars 20, 22 are heated to a temperature greater than or equal to the melt temperature (Tm2) of the seal layer ethylene-based polymer and less than or equal to the melt temperature, Tm1 (or to at least the softening temperature of the ethylene/α-olefin multi-block copolymer), of the base 12. The compression force and heat imparted by the opposing flat bars flat seal bars 20, 22 simultaneously (i) flatten, or otherwise deform, the base 12; (ii) compress the seal layer of each multilayer film 16, 18 against the outer surface of the base 12; (iii) form a seal joint 24 and a seal joint 26 on opposing ends of the flattened base 12; (iv) melt the ethylene-based polymer in the seal layers, (v) soften and/or melt at least some of the ethylene/α-olefin multi-block copolymer present in the base 12, (vi), form a flowable caulk 28 composed of (a) the ethylene/α-olefin multi-block copolymer from the base, (b) the ethylene-based polymer from the seal layers, or (c) a combination of (a) and (b); and (vii) weld upper portion/lower portion 13*a*, 13*b* to respective seal layers of films 16, 18.

In an embodiment, the flattening step entails one, some or all of the following seal conditions:
  (i) a temperature from 160° C., or 170° C. to 180° C., or 190° C., or 200° C.;
  (ii) a pressure (or seal force) from 700 Newtons (N), or 750N to 800N, or 850N, or 900N;
  (iii) application of (i) and/or (ii) for a duration (seal time or dwell time) from 0.1 seconds, or 0.5 seconds, or 0.75 seconds, or 1.0 second, or 2.0 seconds, or 3.0 seconds, or 4.0 seconds, or 5.0 seconds to 6.0 seconds, or 7.0 seconds, or 0.75 seconds, or 8.0 seconds, or 9.0 seconds or 10 seconds.

The compression force fully collapses the base 12 upon itself, so that opposing flattened sides of the base contact each other, closing the base 12, and giving the base 12 a linear configuration B as shown in FIG. 3.

In an embodiment, the compression force and the heating of the closed flat seal bars 20, 22 forces the flowable caulk 28 to move, or otherwise flow, from the outer surface of the base 12 and into the seal joint 24 and into the seal joint 26. The caulk 28 flows into, and fills (wholly or partially), seal joint 24 and seal joint 26 as shown in FIGS. 3 and 4.

The process includes opening the closed flat seal bars 20, 22, thereby removing the compression force and removing the heat from the base 12. When the closed flat seal bars 20, 22 are opened, the elasticity provided by the ethylene/α-olefin multi-block copolymer in the base 12 enables the base 12 to recoil, or otherwise spring back, from the linear, compressed configuration B and return to an open position as shown in FIG. 4. The recoil motion of the base 12 is shown with arrows G in FIG. 4. With recoil, the opposing interior portions of the base wall 15 move away from each other and no longer contact each other. The interior of the base 12 is not sealed to itself. With recoil, the base 12 recovers, and opens, to an elliptical cross section shape after the flat sealing step as shown in FIGS. 4-6.

In an embodiment, the post-flattened base 12 can have either a circular or an elliptical cross-section C as shown in FIG. 4. Applicant discovered that the base 12 composed of the ethylene/α-olefin multi-block copolymer and having a wall 15 thickness from 0.3 mm to 2.0 mm enables the base 12 to withstand the compression force without damage such as crazing, cracking or breaking during full collapse, yet advantageously has sufficient elasticity to spring back to an open configuration upon opening of flat seal bars 20,22.

The opening of the closed flat seal bars forms a welded construction 30 as shown in FIG. 4, whereby multilayer film 16 is welded to the base 12 at upper portion 13*a*, multilayer film 18 is welded to the base 12 at lower portion 13*b*, and the multilayer films are welded to each other where the seal layers directly contact each other.

D. Point Sealing

The process includes point sealing, with opposing curved seal bars, the opposing seal joints. After the flat sealing step, the welded construction 30 moves to a second sealing station. At the second sealing station, opposing curved seal bars 32, 34 close upon the welded construction 30. Each curved seal bar 32, 34 is constructed such that the diameter D of the closed curved seal bars 32, 34 is greater than the diameter E of the base 12 as shown in FIG. 5. At the second sealing station, the caulk 28 is flowable, or is otherwise malleable. Upon closure, the opposing curved seal bars 32, 34 apply a compression force at seal joint 24 and seal joint 26. Hence, "point sealing," as used herein, is the act of applying a compression force, with opposing curved seal bars, at the seal joint 24 and at the seal joint 26 with no, or minimal, contact with the base upper portion 13*a* or the base lower portion 13*b*. In this way, the point sealing pinches the seal layers 16, 18 and the caulk 28 together at the seal joint 24, closing seal joint 24. Similarly, the point sealing pinches the seal layers 16, 18 and the caulk 28 together at the seal joint 26, closing seal joint 26. The point sealing fills, or otherwise closes, any remaining gaps at seal joints 24, 26. During the pinching, the closed curved seal bars 32,34 apply no, or substantially no, heat or compression force on the base upper portion 13*a* or the base lower portion 13*b*.

The point sealing step applies a compressive and pinching force for sufficient duration to enable the caulk 28 to set and solidify, thereby firmly bonding the multilayer films 16, 18 to the base 12 at the seal joints 24, 26. The solidified caulk 28 forms in situ winglets 36, 38 (FIG. 6) completely filling respective seal joints 24, 26, and forming a hermetic seal between the base 12 and the multilayer films 16, 18. An "in situ winglet," as used herein, is a structure that is an extension of the base 12, the in situ winglet being the polymeric solidification of a flowable caulk (caulk 28) composed of the ethylene/α-olefin multi-block copolymer (from the base), the caulk created when the base is flattened under heat, the caulk solidified when seal joints between the films and the base are subsequently pinched and closed. The in situ winglets are composed of, or otherwise are formed from, (i) the ethylene/α-olefin multi-block copolymer (from the base 12), or (ii) a blend of the ethylene/α-olefin multi-block copolymer and the olefin-based polymer (from the seal layer). In this way, the point sealing step forms winglets in situ, during the point sealing process.

In an embodiment, the point sealing step (with opposing curved seal bars 32, 34) includes one, some or all of the following seal conditions:
  (i) a temperature from 18° C., or 20° C., or 22° C. to 25° C., or 30° C.;
  (ii) a pressure (or seal force) from 700N, or 750N to 800N, or 850N, or 900N;
  (iii) application of (i) and/or (ii) for a duration (seal time or dwell time) from 0.1 seconds, or 0.5 seconds, or 1.0 second, or 2.0 seconds, or 3.0 seconds, or 4.0 seconds, or 5.0 seconds to 6.0 seconds, or 7.0 seconds, or 8.0 seconds, or 9.0 seconds or 10 seconds.

In an embodiment, the process includes forming the winglet 36 and/winglet 38 having a length F from 0.5 mm, or 1.0 mm, or 2.0 mm, or 3.0 mm, or 4.0 mm, or 5.0 mm.

In an embodiment, the welded construction is allowed to cool. The point sealing is performed at elevated temperature and fills any gaps remaining at the seal joints or other parts of the welded construction.

E. Flexible Container

The process includes forming a flexible container. The opposing multilayer films 16, 18 are superimposed on each other and form a common peripheral edge 40 as shown in FIG. 7. The process includes sealing the multilayer films 16, 18 along the common peripheral edge and forming a flexible container 42. Formation of the seal along the common peripheral edge 40 can occur before, during or after, the flattening step. Formation of the seal along the common peripheral edge can occur before, during, or after the point sealing step. The process forms a hermetic seal 44 between the base 12 and the multilayer films 16 and 18.

The heat and stress of flat bar sealing of fitment to film to make containers is limited. A fitment composed of low elasticity polyolefin (e.g., LDPE, HDPE) crushes, cracks, breaks, and is unusable. A fitment composed of a polyolefin elastomer (e.g., ENGAGE or VERSIFY elastomers) can exhibit deformation, yet does not recover adequately or welds shut. A fitment composed of a crosslinked elastomer (e.g., TPV) may fully recover but does not seal adequately and does not form a hermetic seal. Applicant surprisingly discovered that a fitment composed of the present ethylene/α-olefin multi-block copolymer recovers (recoils) will not seal to itself, and will seal the fitment to the film of the container using flat bar sealing.

By way of example, and not limitation, examples of the present disclosure are provided.

EXAMPLES

Flexible multilayer films with structures shown in Table 1 below are used in the present examples.

1. Multilayer Films

TABLE 1

Composition of the Flexible Multilayer Film (Film 1) Laminated Multilayer Film

| Material | Description | Density (g/cm³) ASTM D792 | Melt Index (g/10 min) ASTM D1238 | Melting Point (° C.) DSC | Thickness (micro-meter) |
|---|---|---|---|---|---|
| LLDPE | Dowlex ™ 2049 | 0.926 | 1 | 121 | 20 |
| HDPE | Elite ™ 5960G | 0.962 | 0.85 | 134 | 20 |
| LLDPE | Elite ™ 5400G | 0.916 | 1 | 123 | 19 |
| Adhesive Layer | Polyurethane solvent less adhesive (ex. Morfree 970/CR137) | | | | 2 |
| HDPE | Elite ™ 5960G | 0.962 | 0.85 | 134 | 19 |
| HDPE | Elite ™ 5960G | 0.962 | 0.85 | 134 | 20 |
| Seal Layer | Affinity ™ 1146 | 0.899 | 1 | 95 | 20 |
| | Total | | | | 120 |

2. Fitments

Six fitments, fitments 1-6, are provided. The dimensions of each fitment 1-6 are identical, with only the material varying across the fitments. Each fitment 1-6 has a base wall with a thickness of 0.8 mm and a base diameter of 12 mm.

The material and composition for fitments 1-6 are shown in Table 3.

3. Processing Conditions

Each fitment, fitment 1-6, is placed between two opposing films of Film 1 (from Table 1), with seal layers facing each other.

Each fitment-film configuration is subjected to a two-step sealing process (flat seal then pinch seal) with conditions below.

TABLE 2

Processing Conditions for Installing the Fitments

Flat Seal process conditions

Equipment: Sommer Automatic Sealer GP 260
Description: Opposing flat seal bars with independent temperature control and force distribution.

| | |
|---|---|
| Seal force: | 800N |
| Heat seal bar dimensions: (upper and lower) | width: 12.5 mm length: 120 mm |
| Heat seal bar material: | Brass with Teflon tape |
| Air Pressure: | 6 Bars |
| Upper seal bar temperature: | 180° C. +/− 8° C. |
| Lower seal bar temperature: | 180° C. +/− 8° C. |
| Seal time: | 0.75 seconds |

Point seal process conditions

Equipment: pneumatic clamp with semi-circular opening for the spout
Description: opposing curved aluminum seal bars**

| | |
|---|---|
| Seal force: | 800N |
| Heat seal bar dimensions: (upper and lower) | width: 12.5 mm length: 120 mm |
| Heat seal bar material: | Aluminum with Teflon tape |
| Air Pressure: | 6 Bars |
| Upper curved seal bar temperature: | Ambient temperature (22° C.) |
| Lower curved seal bar temperature: | Ambient temperature (22° C.) |
| Seal time: | 1 second |

**Heat dissipation occurs by convection by naturally circulating air around the curved aluminum bars. Optionally, the curved aluminum bars can be cooled by circulating compressed air or another coolant fluid through internal channels made in the aluminum bar.

Results of the tests with different fitments, fitments 1-6, using opposing films of Film 1 are described in Table 3 below.

TABLE 3

| | Material | Description | Density (g/cm³) | MI (g/10 min) | Elastic Recovery+ (%) | Tm (° C.) DSC | Result |
|---|---|---|---|---|---|---|---|
| 1 | Infuse ™ 9817 | Ethylene/octene Multi-block copolymer | 0.877 | 15 | 60-70 | 120 | Spout tube is open, proper seal with no leakage. |

TABLE 3-continued

| | Material | Description | Density (g/cm$^3$) | MI (g/10 min) | Elastic Recovery+ (%) | Tm (° C.) DSC | Result |
|---|---|---|---|---|---|---|---|
| 2 | Infuse ™ 9500 | Ethylene/octene Multi-block copolymer | 0.877 | 5 | 60-70 | 122 | Spout tube is open, proper seal with no leakage. |
| 3 | Infuse ™ 9507 | Ethylene/octene Multi-block copolymer | 0.866 | 5 | 60-70 | 119 | Spout tube is open, proper seal with no leakage. |
| 4 | Engage ™ 8200 | Ethylene-Octene Random Copolymer | 0.870 | 5 | 0-20 | 63 | Total collapse of the spout sealing the opening |
| 5 | DMDA 8920 | High density Polyethylene | 0.956 | 18 | <1 | 130 | Improper seal of edges, severe leakage |
| 6 | Versify ™ 4301 | Propylene Ethylene Random Copolymer | 0.870 | 25* | 0-20 | NA | Improper seal of edges, severe leakage |

*MFR @ 2.16 Kg, 230° C.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
   A. providing a fitment with a base, the base comprising an ethylene/α-olefin multi-block copolymer;
   B. placing the base between two opposing multilayer films, each multilayer film having a respective seal layer comprising an olefin-based polymer;
   C. flat sealing ends of the base to each multilayer film with opposing heated flat seal bars, the flat sealing comprising
      heating, with the opposing flat seal bars, the base to a temperature at least the softening point of the ethylene/α-olefin multi-block copolymer;
      forming a caulk, the caulk comprising a material selected from the group consisting of melted polyolefin from the seal layer, melted ethylene/α-olefin multi-block copolymer from the base, and combinations thereof; and
      filling opposing seal joints with the caulk,
      the flat sealing forming the opposing seal joints at the flattened base ends; and
   D. point sealing the opposing seal joints with opposing curved seal bars to close any gaps at each seal joint, the point sealing comprising solidifying the caulk in the opposing seal joints to form in situ wing lets composed of the solidified caulk.

2. The process of claim 1 comprising recoiling the base to form an elliptical cross section shape.

3. The process of claim 1 comprising:
   selecting, for the base, an ethylene/α-olefin multi-block copolymer with a melt temperature, Tm1, from 115° C. to 125° C.;
   selecting, for the seal layer of the multilayer film, an olefin-based polymer having a melting point, Tm2, wherein Tm2 is from 10° C. to 40° C. less than Tm1.

4. The process of claim 1 comprising forming a seal, with the caulk, between the multilayer films and the fitment at each opposing seal joint.

5. The process of claim 4 wherein the point sealing comprises pinching the seal layers and the caulk together at each seal joint; and
   closing each seal joint.

6. The process of claim 1 comprising forming a hermetic seal between the base and the multilayer films.

7. The process of claim 1 wherein the opposing multilayer films are
   superimposed on each other and form a common peripheral edge;
   sealing the multilayer films along the common peripheral edge; and
   forming a flexible container.

8. A process comprising:
   A. providing a fitment with a base, the base comprising an ethylene/α-olefin multi-block copolymer;
   B. placing the base between two opposing multilayer films, each multilayer film having a respective seal layer comprising an olefin-based polymer;
   C. flat sealing ends of the base to each multilayer film with opposing heated flat seal bars, the flat sealing forming opposing seal joints at the flattened base ends; and
   D. point sealing the opposing seal joints with opposing curved seal bars to close any gaps at each seal joint, the point sealing comprising
      applying a compression force on each seal joint with no contact between the curved seal bars and the multilayer film at an upper portion of the base.

9. The process of claim 8 wherein the point sealing comprises applying a compression force on each seal joint with no contact to a lower portion of the base.

10. The process of claim 9 wherein the point sealing comprises pinching the seal layers and the caulk together at each seal joint; and
    closing each seal joint.

11. The process of claim 8 wherein the point sealing comprises closing the curved seal bars to provide closed seal bars, the closed seal bars having a diameter greater than a diameter of the base.

12. A process comprising:
    A. providing a fitment with a base, the base comprising an ethylene/α-olefin multi-block copolymer;
    B. placing the base between two opposing multilayer films, each multilayer film having a respective seal layer comprising an olefin-based polymer;

C. flat sealing ends of the base to each multilayer film with opposing heated flat seal bars, the flat sealing comprising
   heating, with the opposing flat seal bars, the base to a temperature at least the softening point of the ethylene/α-olefin multi-block copolymer;
   forming a caulk, the caulk comprising a material selected from the group consisting of melted polyolefin from the seal layer, melted ethylene/α-olefin multi-block copolymer from the base, and combinations thereof; and
   filling opposing seal joints with the caulk,
   the flat sealing forming the opposing seal joints at the flattened base ends; and
D. point sealing the opposing seal joints with opposing curved seal bars to close any gaps at each seal joint, the point sealing comprising solidifying the caulk in the opposing seal joints to form in situ winglets composed of the solidified caulk; and
E. forming, with the in situ winglets, a seal between the films and the fitment at the each opposing seal joint.

* * * * *